US012785540B2

United States Patent
Phadke

(10) Patent No.: US 12,785,540 B2
(45) Date of Patent: Nov. 3, 2026

(54) PARALLEL POWER SUPPLY SYSTEM WITH PRECISION CURRENT SHARING

(71) Applicant: Apple Inc., Cupertino, CA (US)

(72) Inventor: Vijay G Phadke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 18/890,940

(22) Filed: Sep. 20, 2024

(65) Prior Publication Data

US 2026/0088703 A1 Mar. 26, 2026

(51) Int. Cl.

*H02M 1/00* (2006.01)
*H02M 3/335* (2006.01)
*H02M 7/04* (2006.01)
*H02M 7/219* (2006.01)

(52) U.S. Cl.

CPC ....... *H02M 1/0083* (2021.05); *H02M 1/0009* (2021.05); *H02M 1/0016* (2021.05); *H02M 1/0025* (2021.05); *H02M 3/33546* (2013.01); *H02M 3/33571* (2021.05); *H02M 7/05* (2021.05); *H02M 7/219* (2013.01)

(58) Field of Classification Search

CPC .... H02M 1/0083; H02M 7/05; H02M 1/0009; H02M 1/0025; H02M 1/0016; H02M 3/33571; H02M 3/33546; H02M 7/219

See application file for complete search history.

(56) References Cited

U.S. PATENT DOCUMENTS 9,444,320 B1 * 9/2016 Weggel ............. H02M 3/33561
12,306,697 B2 * 5/2025 Searles ................. G06F 1/3296
2020/0403500 A1 * 12/2020 Golunski ................ H02J 1/102

* cited by examiner

*Primary Examiner* — Adolf D Berhane
(74) *Attorney, Agent, or Firm* — FLETCHER YODER PC

(57) ABSTRACT

A power supply module can be configured to be placed in a backplane with one or more additional power supply modules having their outputs connected in parallel. The power supply module can include a switching converter that receives an input voltage and produces a regulated output voltage; a voltage regulation loop that selectively regulates the regulated output voltage of the power supply module responsive to an output voltage of the power supply module; a current regulation loop operating in parallel with the voltage regulation loop and selectively regulating an output current of the power supply module responsive to a current command signal received externally from the power supply; and control circuitry that selects an output of either the voltage regulation loop or the current regulation loop and generates therefrom drive signals for switching devices of the switching converter to produce a desired output voltage or output current.

25 Claims, 6 Drawing Sheets

PARALLEL POWER SUPPLY SYSTEM WITH PRECISION CURRENT SHARING

BACKGROUND

Data center servers can consume significant power for computing as well as cooling. This makes power conversion efficiency an important factor. Because computers typically run on DC power, in many applications a power shelf may employ multiple AC/DC power supplies that operate on single phase 200V~277V AC line-to-neutral. To achieve balanced loads on three AC phase, a power rack may employ power supply modules in multiples of three, equally distributed on the three AC line phases. Additional spare power modules may also be provided (e.g., on each phase) to allow operation at full capacity even if one or more power supply modules fail.

As one example, if a server system requires 6 kW of DC power, the power shelf may use three power supplies with their DC outputs coupled in parallel, with each power supply having a 3 kW capacity. These three power supplies can have their AC inputs fed by three different line phases. Thus, even if one power supply module fails, system still gets the required 6 kW power. This is known as N+1 configuration, where system needs N power supplies, and one additional unit is provided for redundancy/fault tolerance.

During normal operation, it may be desired that three power supplies share the power equally. Because these power supply modules are voltage regulated, they may be thought of as voltage sources, which are expected to share output current equally. However, without any kind of current sharing provision, one power supply with highest output voltage may run at max power and others at much lower power. This results in unequal operating temperatures for the power supply modules and lower system reliability.

SUMMARY

Thus, it may be desirable to provide improved current sharing arrangements for power supplies with their outputs connected in parallel. With a suitable current sharing mechanism, each power supply module in the example above can deliver approximately 2 KW power and run at lower temperature to deliver higher reliability.

A power supply system can include a backplane and a plurality of power supply modules disposed in the backplane with their outputs connected in parallel. Each power supply module can further include a switching converter that receives an input voltage and produces a regulated output voltage; a voltage regulation loop that selectively regulates the regulated output voltage of the power supply module responsive to an output voltage of the power supply module; a current regulation loop operating in parallel with the voltage regulation loop and selectively regulating an output current of the power supply module responsive to a current command signal; and control circuitry that selects an output of either the voltage regulation loop or the current regulation loop and generates therefrom drive signals for switching devices of the switching converter to produce a desired output voltage or output current. The backplane can further include a backplane outer voltage regulation loop that receives as an input signal the parallel connected output voltages of the plurality of power supply modules, compares the input signal to a reference voltage corresponding to a desired output voltage of the power supply system, and generates therefrom an output signal that is provided as the current command signal to the current regulation loops of the plurality of power supply modules.

The switching converter can be selected from the group consisting of: an LLC converter, a forward converter, and a buck converter. The input voltage can be an AC voltage or a DC voltage.

Each voltage regulation loop of the plurality of power supply modules can have a reference voltage higher than a reference voltage of the backplane outer voltage regulation loop. The difference between the reference voltage of each voltage regulation loop of the plurality of power supply modules and the reference voltage of the backplane outer voltage regulation loop can be selected to compensate for voltage drop in an output power paths caused by load current. A bandwidth of the backplane outer voltage regulation loop can be lower than a bandwidth of the current regulation loops of the plurality of power supply modules. The bandwidth of the backplane outer voltage regulation loop can be lower than the bandwidth of the current regulation loops of the plurality of power supply modules by at least one frequency decade.

A power supply system can include a backplane and a plurality of power supply modules disposed in the backplane with their outputs connected in parallel. Each power supply module can further include a switching converter that receives an input voltage and produces a regulated output voltage; a voltage regulation loop that selectively regulates the regulated output voltage of the power supply module responsive to an output voltage of the power supply module; a current regulation loop operating in parallel with the voltage regulation loop, the current regulation loop selectively regulating an output current of the power supply module responsive to a current command signal; a current sensor that senses an output current of the power supply module; and control circuitry that selects an output of either the voltage regulation loop or the current regulation loop and generates therefrom drive signals for switching devices of the switching converter to produce a desired output voltage or output current. The backplane can further include a backplane outer voltage regulation loop that produces a current command signal responsive to an output voltage of the power supply system. The current command signal can be provided as the current command signal to the current regulation loops of the plurality of power supply modules. The backplane can further include current summing circuitry that receives an output current signal from the current sensor of each power supply module and produces an average output current signal. The average output current signal can be provided as a feedforward command signal to the current regulation loops of the plurality of power supply modules.

The switching converter can be selected from the group consisting of: an LLC converter, a forward converter, and a buck converter. The input voltage can be an AC voltage or a DC voltage.

Each voltage regulation loop of the plurality of power supply modules can have a reference voltage higher than a reference voltage of the backplane outer voltage regulation loop. The difference between the reference voltage of each voltage regulation loop of the plurality of power supply modules and the reference voltage of the backplane outer voltage regulation loop can be selected to compensate for voltage drop in an output power paths caused by load current. A bandwidth of the backplane outer voltage regulation loop can be lower than a bandwidth of the current regulation loops of the plurality of power supply modules by at least one frequency decade.

The current sensor of each power supply module can directly sense the output current of the power supply module. The current sensor of each power supply module can indirectly sense the output current of the power supply module in another current path that provides a signal proportional to the output current.

A power supply module can be configured to be placed in a backplane with one or more additional power supply modules having their outputs connected in parallel. The power supply module can include a switching converter that receives an input voltage and produces a regulated output voltage; a voltage regulation loop that selectively regulates the regulated output voltage of the power supply module responsive to an output voltage of the power supply module; a current regulation loop operating in parallel with the voltage regulation loop and selectively regulating an output current of the power supply module responsive to a current command signal received externally from the power supply module; and control circuitry that selects an output of either the voltage regulation loop or the current regulation loop and generates therefrom drive signals for switching devices of the switching converter to produce a desired output voltage or output current.

The switching converter can be selected from the group consisting of: an LLC converter, a forward converter, and a buck converter. The input voltage can be an AC voltage or a DC voltage. The power supply module can be a battery backup unit.

The power supply module can further include a current sensor that senses an output current of the power supply module and provides the sensed output current externally to the power supply module. The current sensor can directly sense the output current of the power supply module. The current sensor can indirectly sense the output current of the power supply module in another current path that provides a signal proportional to the output current.

DETAILED DESCRIPTION

Figure 1:
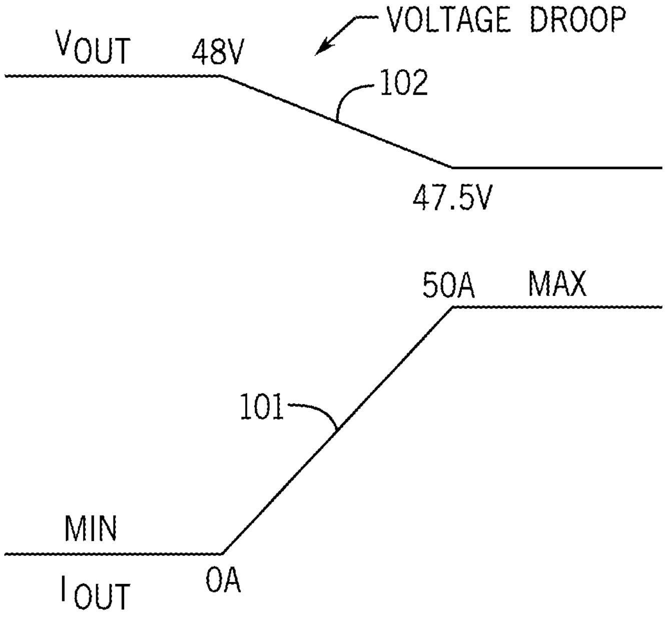
FIG. 1 illustrates a depiction of droop current sharing.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

As described above, current sharing techniques may be useful in the when connecting the outputs of multiple power supplies in parallel. Two examples of current sharing are droop load sharing and active current sharing, which are briefly summarized below.

Droop current sharing, illustrated in FIG. 1, creates a well-defined linear drop in output voltage 102 of the power converter proportional to the load (e.g., current 101). Effectively, this is like adding a series resistor for each power supply in the system of several power supplies. When one power supply delivers higher current, its output voltage drops due to series resistor to make is less competitive. Of course, adding a series resistance is lossy may not be practical, particularly in higher power applications. Thus, the desired characteristic can be emulated by sensing the output current and artificially manipulating the voltage feedback system used for the output regulation.

For example, consider a case of power supply that delivers 48V at 50 A max current. By sensing the output current, a droop of 0.5V can be artificially created in the output such that its voltage drops linearly from 48V to 47.5V as the current increases from 0 A to 50 A. (Each of these values is a mere example, and other minimum and maximum output voltages and currents could be substituted). Multiple "identical" power supplies with such droop characteristics can then be connected in parallel at their outputs. (Even "identical" power supplies may have slight variations due to component tolerances, etc.)

With symmetric connections having balanced impedances in parallel configuration, droop current sharing can offer decent current sharing at full load if all power supplies have the same output voltage. However, there may be several limitations associated with droop current sharing. For example, it is difficult for all power supply modules to have the same output voltages because of component tolerances, variations in operating conditions, etc. As a result, current sharing accuracy can be limited. Additionally, current sharing accuracy may deteriorate rapidly with falling load levels. Furthermore, circuit tolerances, non-linearities or other accuracy limitations in current sensing, as well as other parametric variations can play a significant role in current sharing accuracy. Precision voltage regulation can be difficult to achieve with such configurations. However, although current sharing accuracy may be poor in at least some implementations of droop current sharing such systems can achieve fast response transient load steps.

Figure 2A:
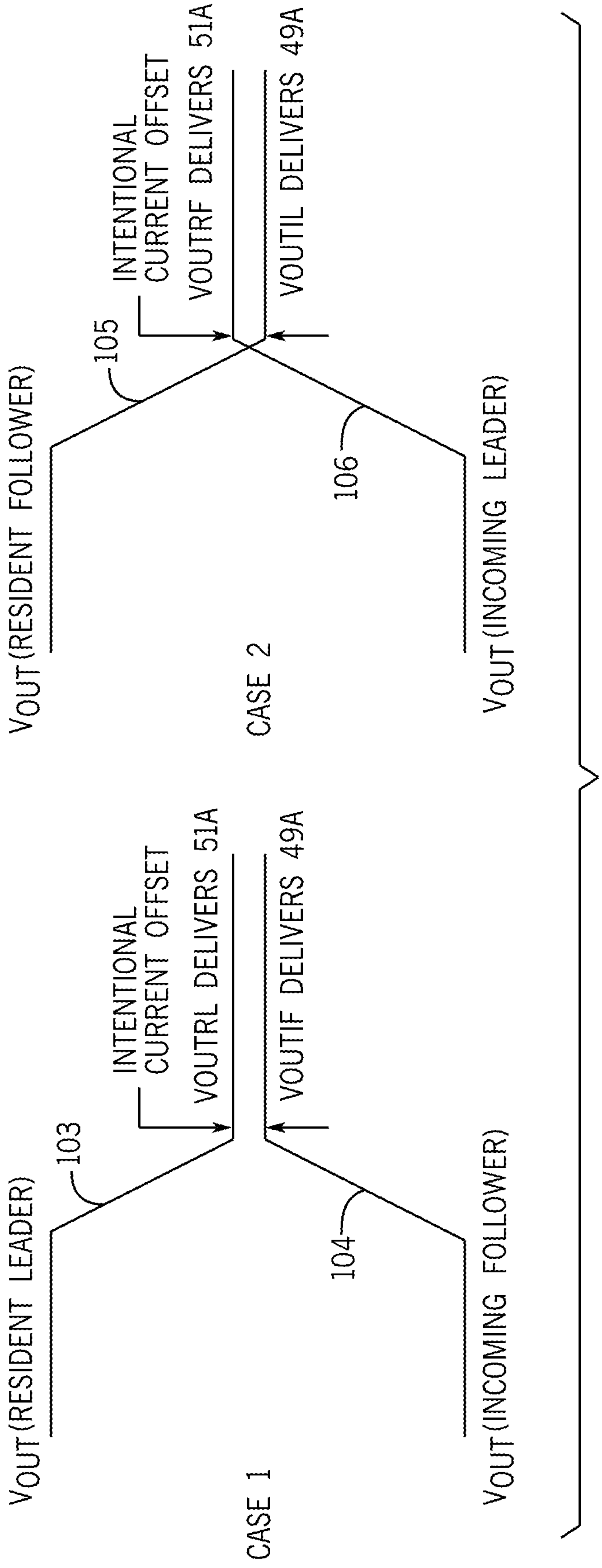
FIGS. 2A-2B illustrate a depiction of active current sharing.
Figure 2B:
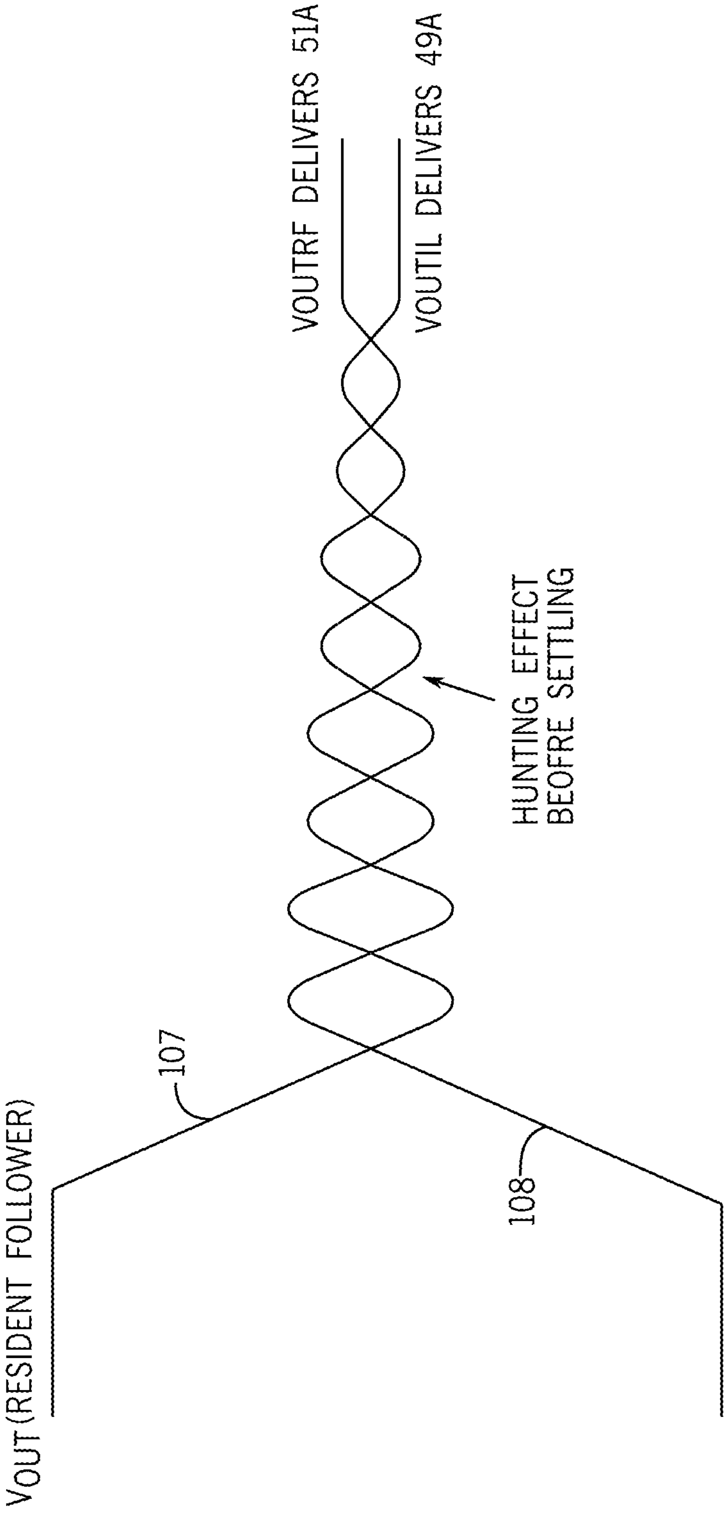

Another method of current sharing control—active current sharing—is illustrated in FIG. 2A-2B. Active current sharing can use one additional connection (signal line) between all the power supplies in the parallel system. This signal line can be called "load share" signal. Each power supply can output this buffered signal, which can be directly proportional to its output current. In at least some applications, this signal can be a current source only that cannot sink current. As a result, the load share signal line of each power supply can be tied together, effectively creating an "OR" d network. This combined load share signal will be dominated by the power supply delivering maximum current.

Each power supply can compare its own current with the load share signal. If current delivered by a power supply is lower than the load share signal, the power supply can increase its output voltage 104 to compete until it matches the load share signal. Otherwise, if current delivered by a power supply is higher than the load share signal, the power supply can decrease its output voltage 103 until it matches the load share signal. In such configurations, one of the power supplies that has the relatively highest output voltage (due to system tolerances, component variation, etc.) will end up taking a "leader" role, and other power supply units will assume the role of "follower."

It may be generally desirable that the followers always stay behind the leader and not try to compete for leadership role. Otherwise, it can result in "hunting" (illustrated in FIG. 2B) that results in oscillations. To minimize this condition, an intentional offset can be provided for the followers versus the leaders. As illustrated in FIG. 2A, this offset between the resident leader and incoming follower can be 2 A. In the case of an incoming leader, with a resident becoming a follower, the basic idea holds, with the resident follower decreasing its output voltage 105 to deliver the lower current (e.g., 49 A), with the incoming leader increasing its output voltage 106 to deliver the higher current (e.g., 51 A). However, even with careful implementation, some hunting can still result, as depicted in FIG. 2B, in which an incoming leader and follower oscillate around the selected current offset before stabilizing.

Careful design is typically needed to implement such systems. For example, if remote sensing at a common node is used for output voltage regulation of all the parallel power supplies, without individual damping impedance for each power supply, control resolution can become critical. With very low power path impedance, just a few millivolts can cause a follower to take up leader role and resulting in instability. Additionally, the current sharing offset is fixed, and thus the gap between the leader and follower remains the same regardless of load level. This means the current sharing accuracy deteriorates at lower loads.

For example, consider a system of two parallel power supplies delivering a total of 100 A. The two power supplies can share the load current with a fixed off-set of, say 2 A. Thus, the leader will deliver 51 A while the follower will provide 49 A, effectively creating a 2% sharing error. At half load (50 A), the offset of 2 A remains the same, but the sharing error becomes 4%, continuously widening on a proportional basis as load decreases. Moreover, to prevent oscillation or hunting behavior, illustrated in FIG. 2B, the current share loop can have very low bandwidth such as 50 Hz~100 Hz. Thus, the current sharing cannot be expected during fast transient loading conditions but only during steady state operation. This causes complications when three or more power supplies are connected in parallel.

Some implementations, such as the Open Compute Project (OCP), can employ power that use a combination of droop current sharing and active current sharing. For example, such power shelves may use three to six power supplies in parallel, equally distributed across three utility line phases. Such system relies on active current sharing to achieve good current sharing during steady state conditions and attempt to improve current sharing during transient load conditions by augmenting operation with droop current sharing, thus attempting to balance precision and speed. However, circuit tolerances can cause some issues in such systems. For example, if one of the power supply modules has higher output voltage set point but lower droop, it can lose its role as leader in some operating condition.

As an illustration, assume a system of two power supplies where one power supply module has an output voltage set point of 48.05V and a droop of 0.5V at full load, while the second power module has output voltage set point of 48.00V and droop of 0.4V. In such a system, the first power supply will be the leader until one particular load condition. Beyond that, the second power supply will attempt to snatch the leadership by being more competitive. In a system where three or more power supplies are used in parallel, this can make situation worse and create instability. Resolving this issue may require extraordinary control and accuracy beyond what may be practicably achievable.

In such all such current sharing methods, the external system (power distribution board, back plane, or bus bar system) is a mere spectator and does not offer any help to the cause. However, the current sharing technique described below uses system involvement to achieve near perfect current sharing of the power supply modules at the power shelf level. Further, this technique does not introduce any limitations on the number of power supplies operating in parallel. As a result, current sharing between the power supply modules can be very accurate over a wide load range and without any need of intentional offset. There is no leader or followers in the employed power supplies. All power supply modules operate as current sources or followers under the command of the system back-plane.

Figure 3:
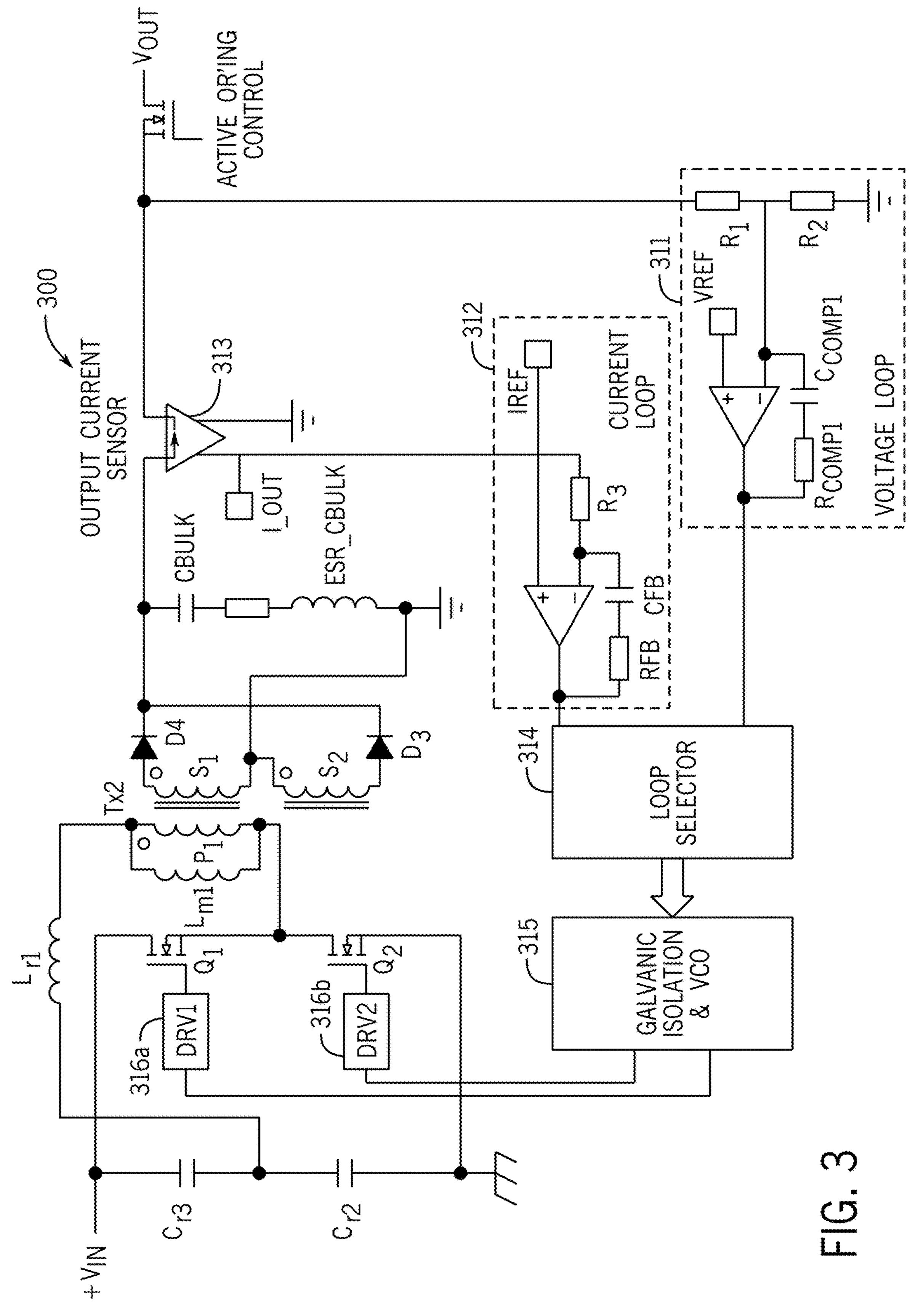
FIG. 3 illustrates a simplified schematic diagram of a power supply module.

Using power shelf based average current mode control the power supply modules used in can be designed using basically the same methodology as in any other current sharing method with a few minor differences, which are described with reference to the power supply 300 of FIG. 3. The power supply can be of any suitable switching converter topology, etc. The switching converter illustrated in FIG. 3 is an LLC converter, made up of switching devices Q1, Q2 and additional components transformer TX2 (with primary winding P1 and secondary windings S1, S2), resonant inductor Lr1, diodes D3, D4, and other components. Such a converter is just one illustrative example, and other converter topologies could also be used, such as forward converters, bridge converters, buck converters (including single-ended and double-ended buck and buck-derived topologies), etc. The switching converter receives an input voltage VIN and procures an output voltage Vout. The received input voltage may be an AC voltage, such as from a utility or grid source, or a DC voltage, such as from a battery, a solar installation, etc. Thus, the unit can be used in any of a variety of application using any of a variety of power sources, including as a battery backup unit. Furthermore, the converter can be based on an isolated topology, in which there is galvanic isolation between input and output, or it can be based on a non-isolated topology.

Firstly, the power supply module need not employ any active current sharing circuitry. Rather, it employs an output current regulation scheme in addition to voltage regulation. Thus, the power supply module can have two regulation loops, output voltage regulation loop 311 and output current regulation loop 312. Further, these loops need to be separate and operate in parallel with only one loop in active control at any given time. Thus, the power supply module 300 can include control circuitry that includes (1) a loop selector 314 that provides the active control signal (from either control loop) to (2) galvanic isolation and voltage-controlled oscillator circuitry 315, which can supply signals to the (3) driver circuits 316*a*/316*b* for the switching devices Q1, Q2. The control circuitry can be implemented using any suitable combination of analog, digital, and/or programmable circuitry, including programmable processors such as a microcontroller. The control circuitry can be implemented as discrete components or modules or can be implemented using one or more integrated circuits. Such configurations can be characterized as Constant Voltage-Constant Current (CVCC) control, which can also be used in battery charging applications. In such a parallel/selectable configuration, both loops can independently have an optimized bandwidth, whereas, if the respective control loops were cascaded, there would be a limitation to separate their bandwidths by a minimum of one decade of frequency, which could deteriorate the response time.

Using one example, a power supply can be rated at 48V, 50 A output (although other output voltages/currents could be used). In this case, the voltage regulation loop 311 in the power supply module can receive the output voltages Vout as feedback (via voltage divider R1/R2) and can be set to regulate the output voltage Vout at slightly higher voltage level than required, e.g., 49V. Voltage regulation loop 311 is illustrated as a proportional-integral control loop with an error amplifier and various passive componentry; however, the voltage regulation loop could be constructed using any suitable combination of analog, digital, and/or programmable circuitry including programmable microcontrollers, etc.

The current regulation loop 312 can receive output current feedback signal via output current sensor 313. This current feedback signal can be based on directly sensing the output current using resistive drop method or any other kind of current sensor, such as Hall effect sensors, etc. Alternatively, the current feedback signal can be derived by processing an indirectly sensed current through devices such as current transformers in other circuit paths which provide signal proportional to output current. In any case, current regulation loop 312 can compare the current feedback signal with a current reference IREF to regulate output current. As with the voltage regulation loop 311, current regulation loop is illustrated as a proportional-integral control loop with an error amplifier and various passive componentry; however, the current regulation loop could be constructed using any suitable combination of analog, digital, and/or programmable circuitry including programmable microcontrollers, etc.

Loop selector circuit 314 can select the dominant loop to control the power converter. Conventionally, the current regulation reference IREF is either fixed as overload protection mechanism or set by a supervisory circuit. For example, when such constant current regulation is used for battery charging, this reference is set by the battery charging algorithm, depending upon various conditions such as charge state, terminal voltage, battery temperature, etc. In the examples described herein, loop selector circuit 314 can use various criteria for selecting between the current loop and the voltage loop, such as using the current loop whenever it is active, selecting the voltage loop if the current drive signal is not present, etc. In the case of power supply 300, current regulation reference IREF can be set by the external system circuits as discussed in greater detail below. Power supply 300 can set a maximum allowable limit on this externally set reference (IREF) for protection purposes.

Figure 4:
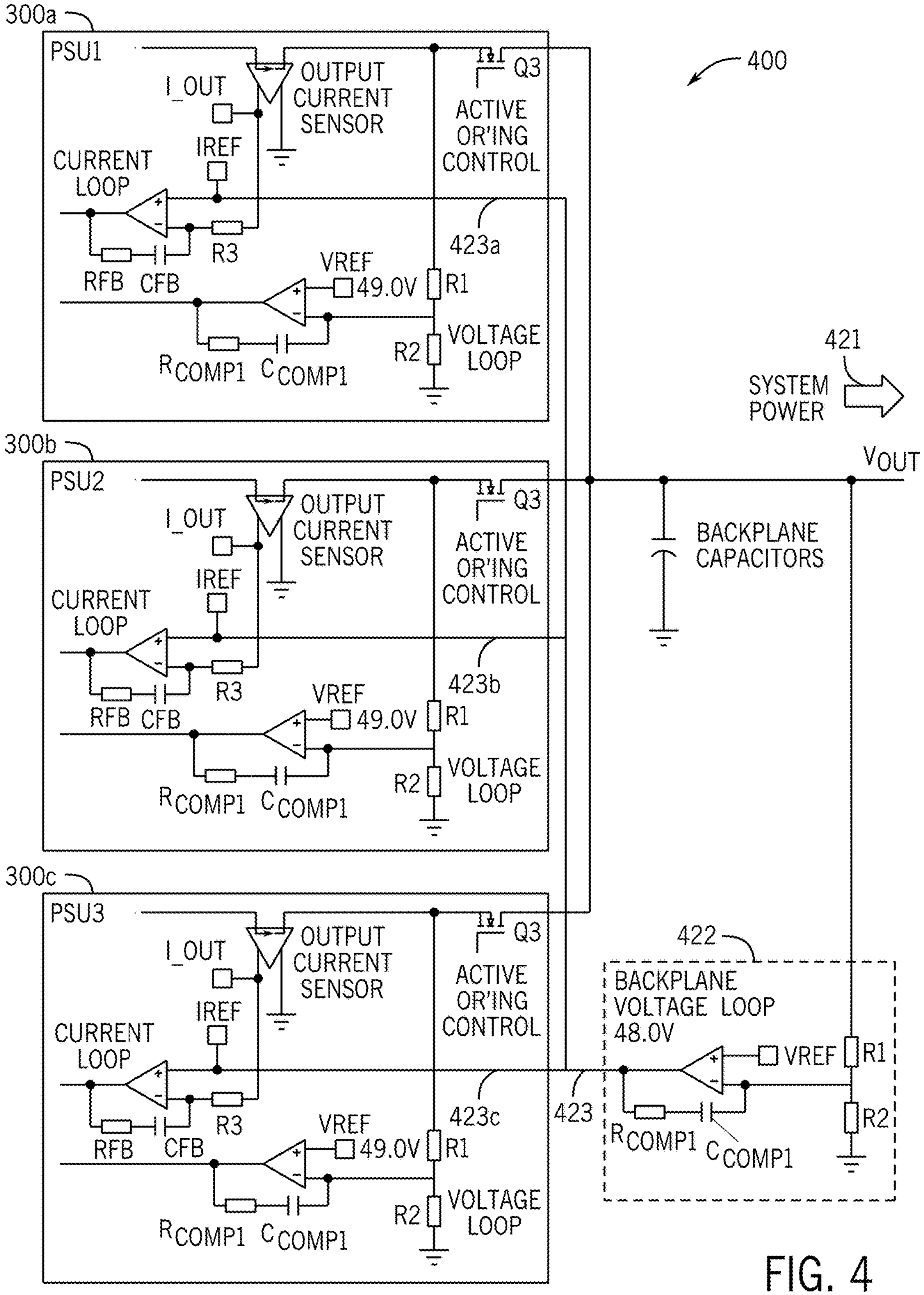
FIG. 4 illustrates a simplified schematic diagram of a power supply system having a backplane and a plurality of power supply modules.

FIG. 4 illustrates an example simplified schematic arrangement of a system back plane 400 along with three 48V/50 A power supplies 300*a*/300*b*/300*c*, connected with their outputs in parallel. Power supplies 300*a*/300*b*/300*c* can be constructed as described above with reference to FIG. 3, and the ratings are mere examples, as other rated voltages/currents could also be used. The configuration of FIG. 4 is one example configuration, and other numbers of power supplies with their outputs connected in parallel could be provided. Similarly, the inputs of the respective power supplies may be connected across the same or differing phases of the AC supply to provide a desired degree of phase balancing as well as sufficient capacity for the combined power supply output.

The system back plane 400 can include an outer voltage regulation loop for the combined system. Backplane outer voltage regulation loop 422 is illustrated in FIG. 4 as a proportional-integral control loop with an error amplifier and various passive componentry; however, the voltage regulation loop could be constructed using any suitable combination of analog, digital, and/or programmable circuitry including programmable microcontrollers, etc. The objective of this outer voltage regulation loop 422 can be regulate the overall output voltage Vout that supplies system power 421. Using the example above, this could be 48V, although other output voltage could be used as appropriate for a given application. The error amplifier (or other circuitry) of outer voltage regulation loop 422 can be compare the system output voltage Vout with a fixed reference (VREF) corresponding to the desired voltage level (e.g., 48V). The error output 423 of the outer voltage regulation loop 422 can be used as the current program or current limit setting (IREF), which can be common to all the parallel power supplies in the system and can be the reference current 423*a*/423*b*/423*c* supplied to the respective current regulation loops of power supplies 300*a*/300*b*/300*c*.

This arrangement can create a voltage regulation technique similar to the use of average current mode control multi-phase buck converters. In other words, the outer voltage regulation loop 422 (in the system backplane) can thus program the current regulation loop (312, FIG. 3) in each power supply module 300*a*/300*b*/300*c*, thereby causing the respective current control loops to regulate the respective output currents of each power supply module 300*a*/300*b*/300*c* as per the program. Because the outer voltage regulation loop regulates at 48V (as one example), while individual power supply modules have their voltage regulation loops 311 set at 49V (as one example), all voltage regulation loops 311 in the respective power supply modules are open. In any case, the result can be that each power supply module 300*a*/300*b*/300*c* effectively operates as a current source.

In this cascaded control loop system (i.e., the cascade between the backplane outer voltage regulation loop 422 and the respective current loops 312 of the power supply modules 300*a*/300*b*/300*c*), for stability purposes it may be desirable to provide a bandwidth separation of at least one frequency decade (or other suitable separation) between the bandwidth of outer voltage regulation loop 422 and the bandwidth of the inner current regulation loops 312 of the power supply modules. However, because the inner current regulation loops 312 can be quite fast, this can allow for the outer voltage regulation loop 422 to also be sufficiently fast to provide the desired response time/degree of regulation for the system output voltage.

Additionally, the current sharing technique illustrated with respect to FIG. 4 does not require any intentional current offset to prevent oscillations, as was described above with reference to FIG. 1-2B. In other words, there is no leader or follower among the power supply modules, as all modules are "followers" of the system command (i.e., the output error signal 423 of backplane voltage regulation loop 422.

It should also be noted that the 1V margin between the backplane outer voltage regulation loop 422 and the respective voltage control loops 311 of the power supply modules 300*a*/300*b*/300*c* is merely one example, and different voltage margins can be selected as desired based on stability, efficiency, and/or other appropriate regulation criteria. For example, it can be expected that the DC voltage drop in the parasitic impedance of the power path would be less than the difference between output voltage regulation level (e.g., 48V) and voltage regulation level of each power supply module 300*a*/300*b*/300*c* (e.g., 49V), which is 1.0V in this example. As a result, all power supply units will effectively operate as current sources. If desired, the individual voltage regulation levels of the respective voltage control loops 311 of the power supply modules 300*a*/300*b*/300*c* (i.e., VREF) can be set to compensate for the voltage drop in power paths due to load current or other stability, efficiency, and/or other regulation criteria.

In the system described above, current sharing accuracy is limited primarily by accuracy of individual current sensors 313 in the power supply modules 300*a*/300*b*/300*c*. Current sensor calibration can be performed for optimized accuracy at a desired operating point and linearization. As one example, a two-point or three-point calibration for the current sensor signal can be performed to allow for excellent current sense accuracy. Additionally, current sense amplifiers having extremely high accuracy (e.g., 0.1%), low off-set voltage of (e.g., a few micro-volts), and low temperature drift are available from various silicon suppliers. Such high accuracy current sense amplifiers combined with precision current shunts and unit level calibration can combine to deliver very high current sense accuracy and near ideal current sharing between the power supply modules. In turn, this can also lead to balanced currents reflected on three AC line phases when single phase power supplies are distributed equally across them to help reduce the neutral wire current.

Moreover, systems designed as described herein can deliver well-tracked and simultaneous increases or decreases in output current when subjected to transient dynamic load conditions as a result of the current command common to all power supply modules. In other words, there is no race between the respective power supply modules during such rise and fall of load current. However, in some applications, if the output current is sensed directly after the internal output bulk capacitors (Cbulk) of the power supply module as shown in FIG. 3, a conflicting response may be seen from the current regulation error amplifier during dynamic load conditions.

As one example, consider a use case of three power supply modules 300*a*/300*b*/300*c* operating in parallel as depicted in FIG. 4. With a steady state load condition of 75 A (as one example) and then a fast step increase in load current to 150 A (as one example). When in steady state conditions at 75 A, the current regulation amplifier in each of the three power supply units receives an identical current regulation command 423*a*/423*b*/423*c* equivalent to 25 A. When system load rapidly rises from 75 A to 150 A, the output capacitors of each power supply unit will support the sudden increase in load demand instantly using their stored energy. The outer voltage regulation loop 422 on system back plane 400 has an inherent response time as a function of its control bandwidth. As a result, it will take some time to respond to increased load demand by increasing the common current regulation command 423/423*a*/423*b*/423*c* to all power supply modules 300*a*/300*b*/300*c*. Meanwhile, the internal current regulation loops 312 of the power supply modules will find themselves in conflict. On the one hand, it will see the peak current delivered by its output bulk capacitance as exceeding the current program (IREF) and, as a result, the current regulation loop 312 will try to reduce the output current of the module, which is the opposite of what is needed. However, the external current program signal 423/423*a*/423*b*/423*c* will take some time to respond and increase the current command; however, some output reduction in each power supply module will have already occurred, potentially resulting in undesirable disruptions of the output voltage (e.g., a brief voltage dip in response to the increased load).

This effect can be less severe if current sensor 313 is not placed after the output bulk capacitor Cbulk, but rather deeper inside the power converter for indirect current sensing. Alternatively, the issue can be addressed using a load follower control methodology, as described below with reference to FIG. 5.

Figure 5:
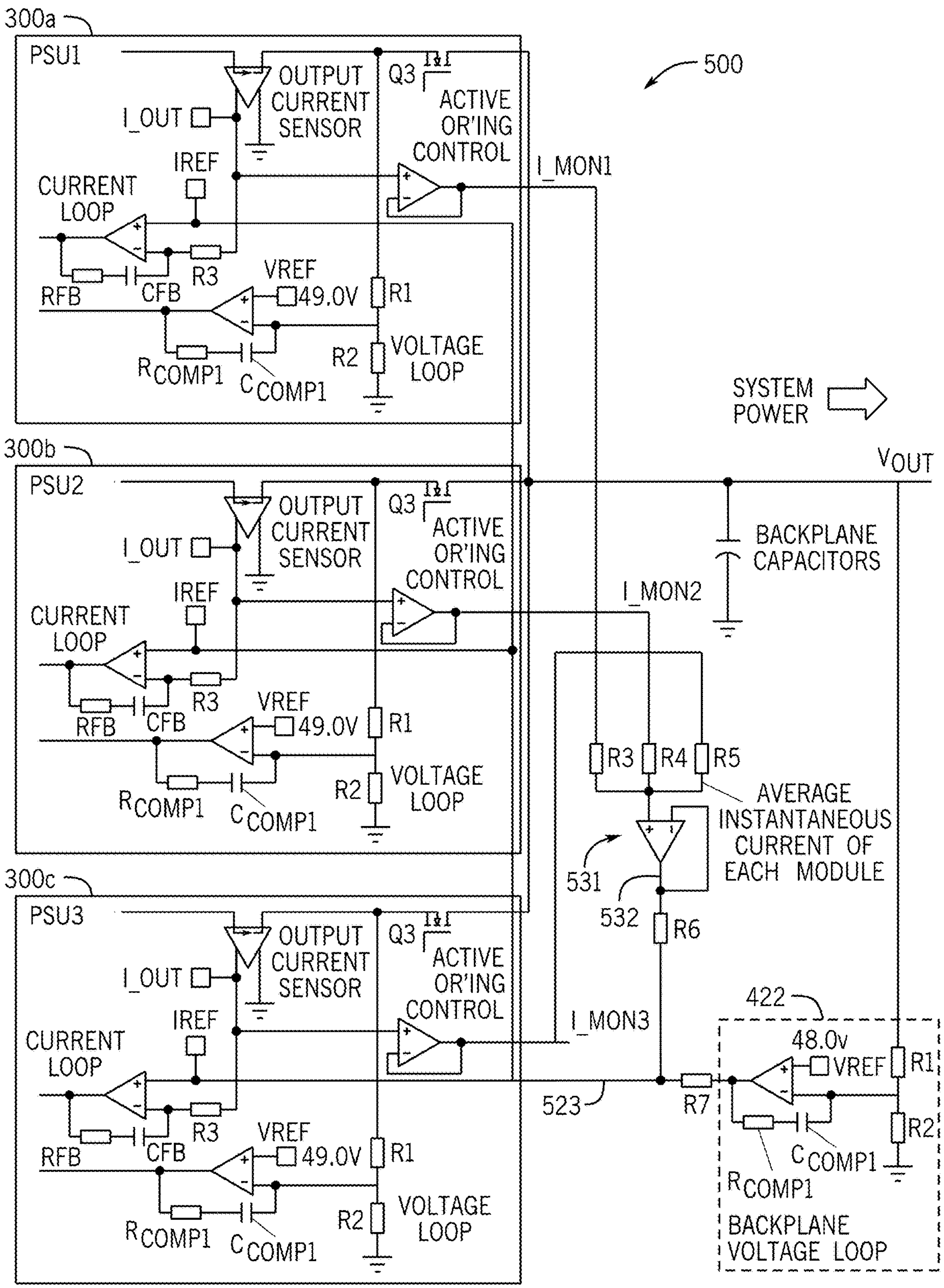
FIG. 5 illustrates an alternative simplified schematic diagram of a power supply system having a backplane and a plurality of power supply modules.

FIG. 5 illustrates an example simplified schematic arrangement of a system back plane 500 along with three 48V/50 A power supplies 300*a*/300*b*/300*c*, connected with their outputs in parallel. The arrangement of FIG. 5 is similar to that of FIG. 4 discussed above. Power supplies 300*a*/300*b*/300*c* can be constructed as described above with reference to FIG. 3, and the ratings are mere examples, as other rated voltages/currents could also be used. The configuration of FIG. 5 is one example configuration, and other numbers of power supplies with their outputs connected in parallel could be provided. Similarly, the inputs of the respective power supplies may be connected across the same or differing phases of the AC supply to provide a desired degree of phase balancing as well as sufficient capacity for the combined power supply output.

The system back plane 500 can include an outer voltage regulation loop 422 for the combined system, again like described above with reference to FIG. 4. Each power supply module 300*a*/300*b*/300*c* can have an output current signal, which can be the same feedback signal that is used to regulate the output current of the module as per an externally set current command. These output current signals are depicted in FIG. 5 as I_MON1, I_MON2, and I_MON3. These three signals (or more or fewer signals, depending on the number of power supply modules) can be summed together using summing circuitry 531. Summing circuitry 531 is depicted as a summing amplifier and three resistors R3, R4, R5, which can have equal resistance values; however, other analog, digital, and/or programmable circuitry could also be employed to achieve the same result. The summed output signal appearing at the output of the summing amplifier will correspond to the average current delivered by each power supply module 300*a*/300*b*/300*c*. This average output current signal 532 can also have a very fast response to load variations as the output current is first delivered by the energy stored in the output capacitance of each power supply module.

In steady state conditions, average output current signal 532, representing the average current delivered by each module, should be equal to the current command signal 523 set for the modules by backplane outer voltage regulation loop 422. While there may be minor difference due to tolerances and variations in current sense elements of each module, these two signals are substantially equal during steady state condition. However, during transient loading conditions, the average output current signal 532 can change very quickly, providing near-instantaneous feedforward to the current command signal. Thus, the correction can be extremely fast and does not need to wait backplane voltage regulator loop response. As a result, the output of backplane outer voltage regulation loop 422 output changes only marginally to compensate for the tolerances of various current sense circuits. The extent of feedforward can be set by choosing the voltage divider between the average instantaneous module current signal and the backplane voltage regulation loop output (depicted as resistors R6, R7 in FIG. 5). This combination of centralized control by the backplane voltage regulation loop described with reference to FIG. 4 and the current feed forward arrangement described with reference to FIG. 5 can provide fast transient load response and highly accurate current sharing between several power supply modules operating with their outputs connected in parallel.

Although the exemplary cases described above use three power supply modules, the techniques described herein can be applied to any number of power supply modules operating with their outputs connected in parallel. It is also possible to selectively disable one or more modules at very low load—or keep them in online operating in a burst mode—and bring them online very rapidly. In such cases, the error seen by the current regulation loops can be large, thereby resulting in rapid response. Although the individual power supply modules described herein do not employ any traditional current sharing implementations, one could add droop current sharing as described above as back up, for example in case there of a fault in the backplane circuitry. In such case, the lowest set voltage level at max load with the droop and the DC voltage drops in the power path still needs to be higher than the voltage set by the external voltage regulation circuit to prevent interference in the current regulation scheme.

The foregoing describes exemplary embodiments of power supply modules with their outputs connected in parallel in a system backplane. Such configurations may be used in a variety of applications but may be particularly advantageous when used in conjunction with power supplies for datacenter computing systems and similar applications. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power supply system comprising a backplane and a plurality of power supply modules disposed in the backplane with their outputs connected in parallel, wherein:

each power supply module further comprises:

a switching converter that receives an input voltage and produces a regulated output voltage;

a voltage regulation loop that selectively regulates the regulated output voltage of the power supply module responsive to an output voltage of the power supply module;

a current regulation loop operating in parallel with the voltage regulation loop, the current regulation loop selectively regulating an output current of the power supply module responsive to a current command signal; and control circuitry that selects an output of either the voltage regulation loop or the current regulation loop and generates therefrom drive signals for switching devices of the switching converter to produce a desired output voltage or output current; and the backplane further comprises:

a backplane outer voltage regulation loop that receives as an input signal the parallel connected output voltages of the plurality of power supply modules, compares the input signal to a reference voltage corresponding to a desired output voltage of the power supply system, and generates therefrom an output signal that is provided as the current command signal to the current regulation loops of the plurality of power supply modules.

2. The power supply system of claim 1 wherein the switching converter is selected from the group consisting of: an LLC converter, a forward converter, and a buck converter.

3. The power supply system of claim 1 wherein the input voltage is an AC voltage.

4. The power supply system of claim 1 wherein the input voltage is a DC voltage.

5. The power supply system of claim 1 wherein each voltage regulation loop of the plurality of power supply modules has a reference voltage higher than a reference voltage of the backplane outer voltage regulation loop.

6. The power supply system of claim 5 wherein the difference between the reference voltage of each voltage regulation loop of the plurality of power supply modules and the reference voltage of the backplane outer voltage regulation loop is selected to compensate for voltage drop in an output power paths caused by load current.

7. The power supply system of claim 1 wherein a bandwidth of the backplane outer voltage regulation loop is lower than a bandwidth of the current regulation loops of the plurality of power supply modules.

8. The power supply system of claim 7 wherein the bandwidth of the backplane outer voltage regulation loop is lower than the bandwidth of the current regulation loops of the plurality of power supply modules by at least one frequency decade.

9. A power supply system comprising a backplane and a plurality of power supply modules disposed in the backplane with their outputs connected in parallel, wherein:

each power supply module further comprises:

a switching converter that receives an input voltage and produces a regulated output voltage;

a voltage regulation loop that selectively regulates the regulated output voltage of the power supply module responsive to an output voltage of the power supply module;

a current regulation loop operating in parallel with the voltage regulation loop, the current regulation loop selectively regulating an output current of the power supply module responsive to a current command signal;

a current sensor that senses the output current of the power supply module; and control circuitry that selects an output of either the voltage regulation loop or the current regulation loop and generates therefrom drive signals for switching devices of the switching converter to produce a desired output voltage or output current; and the backplane further comprises:

a backplane outer voltage regulation loop that produces the current command signal responsive to an output voltage of the power supply system, wherein the current command signal is provided as the current command signal to the current regulation loops of the plurality of power supply modules; and current summing circuitry that receives an output current signal from the current sensor of each power supply module and produces an average output current signal, wherein the average output current signal is provided as a feedforward command signal to the current regulation loops of the plurality of power supply modules.

10. The power supply system of claim 9 wherein the switching converter is selected from the group consisting of: an LLC converter, a forward converter, and a buck converter.

11. The power supply system of claim 9 wherein the input voltage is an AC voltage.

12. The power supply system of claim 9 wherein the input voltage is a DC voltage.

13. The power supply system of claim 9 wherein each voltage regulation loop of the plurality of power supply modules has a reference voltage higher than a reference voltage of the backplane outer voltage regulation loop.

14. The power supply system of claim 13 wherein the difference between the reference voltage of each voltage regulation loop of the plurality of power supply modules and the reference voltage of the backplane outer voltage regulation loop is selected to compensate for voltage drop in an output power paths caused by load current.

15. The power supply system of claim 9 wherein a bandwidth of the backplane outer voltage regulation loop is lower than a bandwidth of the current regulation loops of the plurality of power supply modules by at least one frequency decade.

16. The power supply system of claim 9 wherein the current sensor of each power supply module directly senses the output current of the power supply module.

17. The power supply system of claim 9 wherein the current sensor of each power supply module indirectly senses the output current of the power supply module in another current path that provides a signal proportional to the output current.

18. A power supply module configured to be placed in a backplane with one or more additional power supply modules having their outputs connected in parallel, the power supply module comprising:

a switching converter that receives an input voltage and produces a regulated output voltage;

a voltage regulation loop that selectively regulates the regulated output voltage of the power supply module responsive to an output voltage of the power supply module;

a current regulation loop operating in parallel with the voltage regulation loop, the current regulation loop selectively regulating an output current of the power supply module responsive to a current command signal received externally from the power supply module; and control circuitry that selects an output of either the voltage regulation loop or the current regulation loop and generates therefrom drive signals for switching devices of the switching converter to produce a desired output voltage or output current.

19. The power supply module of claim 18 wherein the switching converter is selected from the group consisting of: an LLC converter, a forward converter, and a buck converter.

20. The power supply module of claim 18 wherein the input voltage is an AC voltage.

21. The power supply module of claim 18 wherein the input voltage is a DC voltage.

22. The power supply module of claim 21 wherein the power supply module is a battery backup unit.

23. The power supply module of claim 18 further comprising a current sensor that senses an output current of the power supply module and provides the sensed output current externally to the power supply module.

24. The power supply module of claim 23 wherein the current sensor directly senses the output current of the power supply module.

25. The power supply module of claim 23 wherein the current sensor indirectly senses the output current of the power supply module in another current path that provides a signal proportional to the output current.

* * * * *